United States Patent Office
3,432,551
Patented Mar. 11, 1969

3,432,551
3,4,5-TRIMETHOXYBENZOYLGUANIDINES
Aldo Garzia, Milan, Italy, assignor to Istituto Chemioterapico Italiano S.p.A., Milan, Italy, a corporation of Italy
No Drawing. Filed May 23, 1966, Ser. No. 551,919
U.S. Cl. 260—559                      5 Claims
Int. Cl. C07c *103/20, 103/22;* A61k *27/00*

---

ABSTRACT OF THE DISCLOSURE

As compositions of matter guanidines of the formula

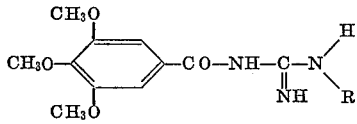

wherein R is an alkyl radical having one to three carbon atoms and an acid addition salt thereof. The compositions are useful as hypotensive agents for laboratory animals such as rats, mice, cats and dogs.

---

This invention relates to novel compositions of matter. In a particular aspect this invention relates to novel trimethoxybenzoyl guanidines of the formula

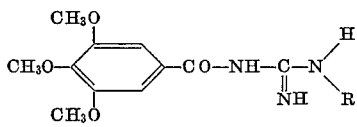

wherein R is an alkyl radical having from 1 to 3 carbon atoms inclusive, and to their acid addition salts. In a further aspect this invention relates to a process for preparing the above defined trimethoxybenzoyl guanidines.

An object of the present invention is the provision of the novel trimethoxybenzoyl guanidines of the formula

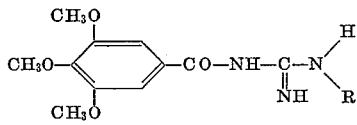

wherein R is defined as above. Included among the trimethoxybenzoyl guanidines of the present invention are 3,4,5 - trimethoxybenzoyl - N-methyl guanidine, 3,4,5-trimethoxybenzoyl-N-ethyl guanidine, 3,4,5-trimethoxybenzoyl-N-isopropyl guanidine and their respective acid addition salts as illustrated by the hydrochlorides and the sulfates.

A further object of the present invention is the provision of a process for the production of novel trimethoxybenzoyl guanidines of the formula

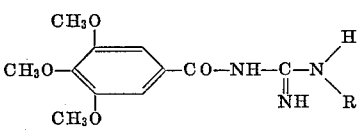

wherein R is defined as above.

Additional objects and advantages of the present invention will be obvious from the specification and the appended claims.

The novel compositions of the present invention are prepared by the condensation of an alkyl substituted guanidine of the formula

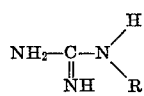

wherein the R substituent is defined as above with the methyl ester of 3,4,5-trimethoxy benzoic acid. The reaction may be represented as follows

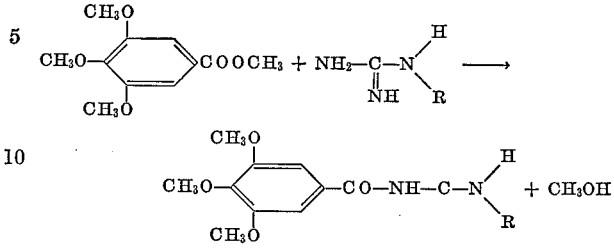

The reaction is preferably carried out in an inert solvent which will dissolve the reactants but which does not itself enter into undesirable side reactions. Dimethylformamide has been found to be particularly suitable but other useful solvents such as benzene, xylene and toluene may also be used.

The reaction is typically conducted at a temperature in the range of from about 100 to about 130° C. Temperatures below about 100° C. are generally not practical because of the slow rate of reaction while temperatures above 130° C. tend to cause decomposition of the reactants and the reaction products.

The molecular proportions used in producing the novel compositions of the present invention can vary over a wide range. Typically mole ratios of 3,4,5-trimethoxybenzoic acid methyl esters to alkyl substituted guanidine of about 5:1 to about 1:5 may be satisfactorily employed with mole ratios of approximately 1:1 being preferred.

The novel compositions of the present invention can be obtained as the free base or in the form of their acid addition salts. Salts of the free base are prepared in the known manner with suitable acids as for example by treatment with hydrochloric acid or sulfuric acid. The salts can be converted to the free base in the known manner by treatment with an alkaline agent such as an alkali metal hydroxide. The salts of the new compositions may also be used for purifying the free base; thus the free base is converted to its salt, the latter separated from the reaction medium and the free base then liberated from the salt.

The starting materials are known and may be prepared by known means. The 3,4,5-trimethoxybenzoic acid methyl ester is prepared by dissolving 3,4,5-trimethoxybenzoic acid in methanol and refluxing the solution in the presence of an acidic condensation agent such as sulfuric acid. 3,4,5-trimethoxybenzoic acid may be prepared by the method described by Gilman in Organic Synthesis, vol. 1, page 522 (1932). The alkyl substituted guanidines are prepared by reacting an alkyl substituted guanidine sulfate with sodium methylate in the presence of a suitable solvent such as methanol. The alkyl substituted guanidine sulfate may be prepared by the method described by Crowther in Journal of the Chemical Society, 1948, part II, page 1641.

The new compositions of the present invention possess valuable pharmacological properties and are distinguished by their hypotensive effect on valuable laboratory animals such as rats, mice, cats and dogs. The compositions are especially useful in experiments requiring a marked reduction in arterial blood pressure. The new compositions may be used in the form of pharmaceutical preparations containing said compositions in conjunction with solid or liquid pharmaceutical vehicles suitable for enteral or parenteral administration. Suitable vehicles are substances that do not react with the compositions such as for example gelatin, lactose, starches, talc, vegetable oils, saline solutions or other known medical excipients. The pharmaceutical preparations may be for example tablets or capsules or in liquid injectable form such as solutions, suspensions or emulsions.

The invention will be understood more fully by reference to the following examples. It is understood that the examples are for purposes of illustration only and are not intended as a limitation of the invention.

EXAMPLE 1

To a solution of 23 grams of sodium methylate in 500 cc. of methanol were added 150 grams of N-isopropyl guanidine sulfate. The whole was then heated to about 55° C. and maintained at that temperature for approximately 3 hours. The reaction mixture was then filtered to remove precipitated sodium sulfate. The resulting filtrate was then slowly added to a solution of 226 grams of 3,4,5-trimethoxybenzoic acid methyl ester in 400 cc. of dimethylformamide. The resulting mixture was then distilled under reduced pressure for approximately 1 hour at about 75° C. to remove methanol. The reaction mixture was then heated at atmospheric pressure to approximately 100° C. and maintained at that temperature for approximately 25 hours. At the end of the 25 hour period the reaction mixture was again filtered to remove precipitated sodium sulfate. To the filtrate was then added a methanol solution of hydrogen chloride whereupon the hydrochloride of 3,4,5 - trimethoxybenzoyl - N-isopropyl guanidine was precipitated. The thus obtained 3,4,5-trimethoxybenzoyl-N-isopropyl guanidine was then washed with acetone and dried at 50° C. The melting point of the 3,4,5-trimethoxybenzoyl-N-isopropyl guanidine hydrochloride is 187–190° C.

EXAMPLE 2

The process of Example 1 is repeated in all essential details with the exception that N-methyl guanidine sulfate was substituted for N-isopropyl guanidine sulfate. 3,4,5-trimethoxybenzoyl - N - methyl guanidine is obtained. (Melting point 214–215° C.)

EXAMPLE 3

The process of Example 1 is repeated in all essential details with the exception that ethyl guanidine sulfate is substituted for isopropyl guanidine sulfate. 3,4,5-trimethoxybenzoyl-N-ethyl guanidine is obtained. (Melting point 182° C.)

EXAMPLE 4

The hypotensive activity of the 3,4,5-trimethoxybenzoyl guanidines of the present invention was observed in animals to which they had been administered. The activity is illustrated by the test hereinafter described in which adult cats were used as experimental animals. Each cat was given a dosage of 50 milligrams of 3,4,5-trimethoxybenzoyl guanidine per kilogram of body weight. The dosages were administered intraperitoneally in saline solution. Before administration hypertension was induced in each animal by administration to the animal of the hormone norepinephrine. During the test the arterial blood pressure of each animal was determined at regular intervals. The results are presented in the following table. These results show that the blood pressure of cats is reduced by the administration of hypotensive dosages of the trimethoxy benzoyl guanidines of the present invention. From these results it is predictable that the trimethoxybenzoyl guanidines of the present invention would have hypotensive effect on humans.

TABLE

| Composition | Hypotensive activity* | Time after administration of fmax. activity (hour) | Duration activity (hours) | No. of animals tested |
|---|---|---|---|---|
| 3,4,5-trimethoxy-benzoyl-N-isopropyl guanidine hydrochloride | +++++ | ½ | 2–3 | 50 |
| 3,4,5-trimethoxy-benzoyl-N-methyl guanidine hydrochloride | +++ | ½ | 1–2 | 50 |
| 3,4,5-trimethoxy benzoyl-N-ethyl guanidine hydrochloride | +++ | ½ | 1–2 | 50 |

*The evaluation of hypotensive effect was made on the basis of an arbitrary scale varying for (no effect) to +++++ (maximum effect). A maximum effect is indicated by a reduction in arterial blood pressure of 40%.

It will be appreciated that the dosage of 3,4,5-trimethoxybenzoyl guanidine required will vary depending among other things upon the particular composition selected, the species of animal to be treated, and the individual animal's response to the drug. A single effective dosage will typically range from about 10 to about 500 milligrams per kilogram of animal body weight. Dosages in excess of about 1500 to about 2000 milligrams per kilogram of body weight have been found to be toxic and therefore should be avoided.

Since many embodiments may be made in this invention and since many changes may be made in the embodiments described, the foregoing is to be taken as illustrative only and the invention is defined by the claims appended hereto.

What I claim is:

1. A composition of matter having the formula

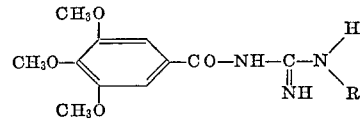

wherein R is an alkyl radical having 1 to 3 carbon atoms inclusive and an acid addition salt thereof selected from the group consisting of the sulfate and the hydrochloride.

2. 3,4,5-trimethoxybenzoyl-N-isopropyl guanidine.
3. 3,4,5-trimethoxybenzoyl-N-methyl guanidine.
4. 3,4,5-trimethoxybenzoyl-N-ethyl guanidine.
5. 3,4,5-trimethoxybenzoyl-N-isopropyl guanidine hydrochloride.

References Cited

UNITED STATES PATENTS 3,332,988    7/1967    Mull _____ 260—558

HENRY R. JILES, Primary Examiner.

H. I. MOATZ, Assistant Examiner.

U.S. Cl. X.R.

424—324